(No Model.)
J. L. SCOTT.
BEARING FOR VEHICLE WHEELS.
No. 552,008.  Patented Dec. 24, 1895.
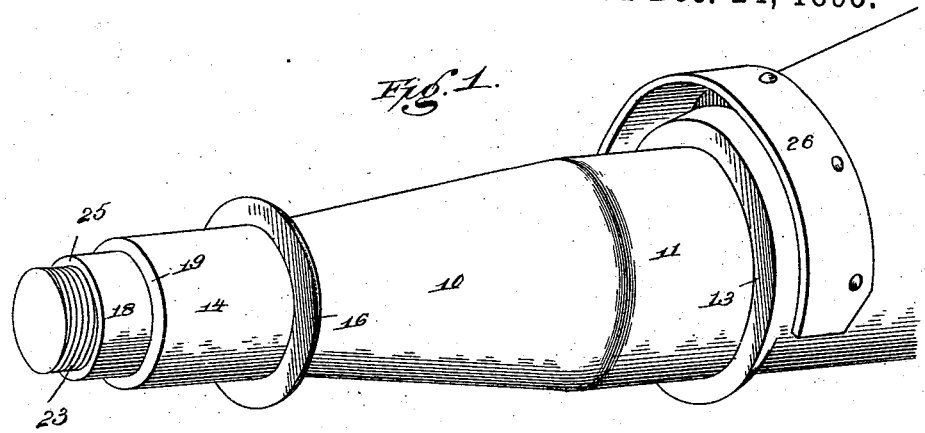
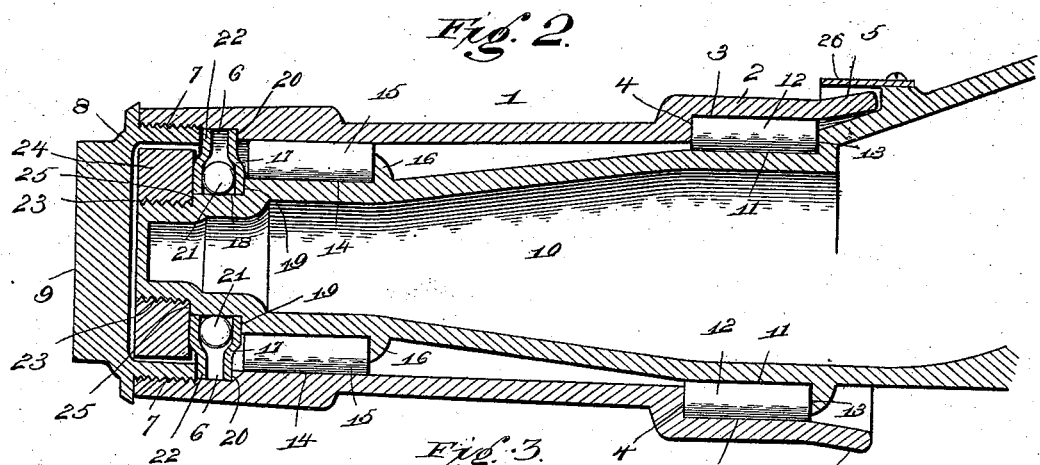
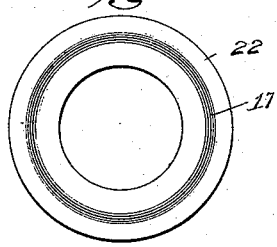
Witnesses  
John C. Shaw  
R. W. Smith
By his Attorneys.  
C. A. Snow & Co.
Inventor  
John L. Scott,

UNITED STATES PATENT OFFICE.

JOHN L. SCOTT, OF NORTH WEBSTER, INDIANA.

BEARING FOR VEHICLE-WHEELS.

SPECIFICATION forming part of Letters Patent No. 552,008, dated December 24, 1895.

Application filed March 23, 1895. Serial No. 542,961. (No model.)

*To all whom it may concern:*

Be it known that I, JOHN L. SCOTT, a citizen of the United States, residing at North Webster, in the county of Kosciusko and State of Indiana, have invented new and useful Bearings for Vehicle-Wheels, of which the following is a specification.

This invention relates to an improvement in antifriction-bearings designed particularly for use in connection with the axle-skeins and hubs of wagons, buggies, or other wheeled vehicles.

The object of the present invention is to simplify and improve the construction of antifriction-bearings, to adapt the same particularly for wheeled vehicles, whereby end-thrust is compensated for and the friction due thereto relieved; to provide separate and independent bearings for supporting the weight of the vehicle and its load, and to provide a double lock for the end of the axle-skein and outer end of the wheel-hub, and to render the same capable of rapid and easy adjustment.

To this end the invention consists in a tapering axle-skein provided with two or more cylindrical portions for the reception of and in combination with independent series of rollers surrounding said portion and bearing against the inner face or wall of the axle-box.

It further consists in reducing the diameter of said skein near its outer end, thereby forming a shoulder adapting the same to receive a pair of washers or circular bearing-plates, between which is located a series of antifriction-balls; in the manner of locking the parts in place under their proper arrangement, and in certain features and details of construction and arrangement of parts hereinafter fully described, illustrated in the drawings, and pointed out in the claims.

In the accompanying drawings, Figure 1 is a perspective view of an axle-skein made in comformity with my improvements. Fig. 2 is a vertical longitudinal section through an axle box and skein, showing the interior arrangement and relations of the several parts. Fig. 3 is a detail view of one of the bearing plates or washers against which the balls at the outer end of the axle-skein operate.

Similar numerals of reference indicate corresponding parts in the several figures of the drawings.

Referring to the drawings, 1 designates an axle-box having an enlarged inner end 2, adapting the same to be provided with a recess 3 of increased internal diameter as compared with the main body of the box, also forming a shoulder 4, the purpose of which will appear. The extreme inner edge of the box 1 is flared out, as indicated at 5, and the opposite or outer end of the box is formed with a groove or recess 6, the outer portion of which is screw-threaded, as shown at 7, for the reception of an externally-threaded nut or cap 8 having a polygonal head 9 adapting it to receive a tightening-wrench.

My improved axle-skein 10 is made tapering, as indicated, and provided with a series of horizontal steps or cylindrical portions, as follows: At or near the inner end of the axle-box and opposite to the recess 3, above described, said skein is formed with a horizontally-extending cylindrical seat 11, between which and the wall of the recess 3 is arranged a series of antifriction-rollers 12, held in place laterally between the shoulder 4, above referred to, on the axle-box, and a corresponding shoulder 13 formed integrally with the axle-skein. Near the outer end of said skein the latter is provided with a similar horizontally-extending cylindrical seat 14, between which and the inner wall of the box 1 another series of antifriction-rollers 15 are adapted to travel. The rollers 15 are held in place laterally by means of an integrally-formed flange 16 on the axle-skein and a circular bearing plate or washer 17 surrounding the skein 10 near its outer end, where it is reduced in diameter outside of the seat 14, as indicated at 18. By reducing the diameter of the skein at 18 a shoulder 19 is formed, which, in connection with a corresponding shoulder 20 within the axle-box, forms a seat against which the bearing plate or washer 17 rests.

A series of antifriction case-hardened balls 21 surrounds the horizontally-extending cylindrical seat 18, being held in place by means of a bearing plate or washer 22, similar and oppositely disposed to the washer 17 above described. Beyond the cylindrical seat 18 the skein is again reduced in diameter, and screw-threaded, as indicated at 23, for the reception of an internally-threaded nut 24, which screws against a shoulder 25 and holds the bearing plate or washer 22 against displacement.

The skein 10 is hollowed out, as shown, to receive the outer end of an axle, and just inside of the inner edge of the axle-box the skein is provided with an annular flange or seat to which is secured a curved hood or plate 26, which forms a sand band or guard overlying and partially surrounding the inner flared or bell-mouthed end of the axle-box.

From the foregoing description it will be readily understood that the antifriction-rollers 12 and 15 support the weight of the vehicle and its load, while the balls 21, held in place, as described, are adapted to receive the end-thrust of the axle, thereby effectively preventing friction and the binding of the parts. By providing two separate and independent nuts 9 and 24 the parts are more effectively locked in place and the admission of dust, dirt, &c., to the interior of the axle-box prevented.

Various changes in the form, proportion, and the minor details of construction may be resorted to without departing from the principle or sacrificing any of the advantages of this invention.

Having thus described the invention, what is claimed as new, and desired to be secured by Letters Patent, is—

1. The combination with an axle skein having its outer end reduced in diameter and formed with a cylindrical horizontal seat and a vertical annular shoulder, of an axle box provided with an internal annular shoulder, a series of anti-friction balls disposed around the reduced extremity of the skein, the cup shaped wearing plates or washers mounted loosely upon the reduced end of the skein, one of said plates or washers bearing against the annular shoulders on the skein and within the axle box, and a nut on the extremity of said skein bearing against the outer wearing plate or washer for adjusting the latter, substantially as and for the purpose described.

2. In an anti-friction bearing for vehicles, an internally recessed and shouldered axle box, and a cylindrical and shouldered axle skein having a reduced outer end in combination with two independent series of anti-friction rollers interposed between the axle box and skein, a series of balls for receiving the end thrust of the axle, the oppositely disposed wearing plates mounted loosely on the reduced outer end of the skein and including said balls between them, a nut surrounding the end of the axle skein and bearing against the outside plate or cup, and an externally threaded nut or cap engaging with the internally threaded end of the axle box, substantially as and for the purpose specified.

In testimony that I claim the foregoing as my own I have hereto affixed my signature in the presence of two witnesses.

JOHN L. SCOTT.

Witnesses:
VICTOR D. MOCK,
JEROME W. DEASDORFF.